(12) United States Patent
Viswanadha

(10) Patent No.: US 12,174,846 B2
(45) Date of Patent: Dec. 24, 2024

(54) SCALABLE IMPLEMENTATIONS OF EXACT DISTINCT COUNTS AND MULTIPLE EXACT DISTINCT COUNTS IN DISTRIBUTED QUERY PROCESSING SYSTEMS

(71) Applicant: Microsoft Technology Licensing, LLC, Redmond, WA (US)

(72) Inventor: Sreenivasa Viswanadha, Cupertino, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1413 days.

(21) Appl. No.: 16/205,984

(22) Filed: Nov. 30, 2018

(65) Prior Publication Data
US 2020/0175011 A1    Jun. 4, 2020

(51) Int. Cl.
*G06F 16/2458* (2019.01)
*G06F 16/2455* (2019.01)
*G06F 16/27* (2019.01)
*G06F 16/903* (2019.01)

(52) U.S. Cl.
CPC .... *G06F 16/2471* (2019.01); *G06F 16/24554* (2019.01); *G06F 16/278* (2019.01); *G06F 16/90348* (2019.01)

(58) Field of Classification Search
None
See application file for complete search history.

(56) References Cited

U.S. PATENT DOCUMENTS

| | | | |
|---|---|---|---|
| 2007/0106643 A1* | 5/2007 | Croft | G06F 16/283 |
| 2007/0239663 A1 | 10/2007 | Dyskant | |
| 2013/0124525 A1 | 5/2013 | Anderson et al. | |

(Continued)

FOREIGN PATENT DOCUMENTS

WO    0247463 A2    6/2002

OTHER PUBLICATIONS

"International Search Report and Written Opinion Issued in PCT Application No. PCT/US19/062085", Mailed Date: Feb. 12, 2020, 12 Pages.

(Continued)

*Primary Examiner* — Eddy Cheung
(74) *Attorney, Agent, or Firm* — Weaver IP L.L.C.

(57) ABSTRACT

Scalable implementations of exact distinct counts and multiple exact distinct counts in distributed query processing systems are implemented via systems and devices. Distinct counts and multiple exact distinct counts for identifiers/values are performed based on keys. For distinct counts, datasets including data fields are sorted by values of fields and divided into balanced partitions in distributed servers. Subsets of fields with the same value are partitioned together. Key presence is determined for subsets on each partition, and the number of instances for the key are aggregated for exact distinct counts of values. For multiple distinct counts, fields of a dataset are combined by un-pivoting field columns. Compound keys are generated for combined fields from field identifiers of the combined fields and values of another field. Totals of unique values of the combined fields are determined for values in the counted field based on the compound keys.

20 Claims, 7 Drawing Sheets

(56) References Cited

U.S. PATENT DOCUMENTS

2014/0351254 A1   11/2014  Fricke et al.
2016/0283574 A1*  9/2016  Anderson ......... G06F 16/24534
2020/0050680 A1   2/2020   Murphy et al.
2020/0174997 A1   6/2020   Viswanadha

OTHER PUBLICATIONS

"International Search Report and Written Opinion Issued in PCT Application No. PCT/US19/062899", Mailed Date: Feb. 19, 2020, 11 Pages.
"Non Final Office Action Issued In U.S. Appl. No. 16/206,022", Mailed Date: Mar. 12, 2021, 29 Pages.
"Decision to grant Issued in European Patent Application No. 19820974.4", Mailed Date: Feb. 23, 2023, 2 Pages.
"Office Action Issued in European Patent Application No. 19817895.6", Mailed Date: Dec. 5, 2022, 7 Pages.
"Notice of Allowance Issued in European Patent Application No. 19820974.4", Mailed Date: Oct. 27, 2022, 7 Pages.
Office Action Received for European Application No. 19817895.6, mailed on Dec. 18, 2023, 10 pages.
Communication pursuant to Article 94(3) received in European Application No. 19817895.6, mailed on Sep. 13, 2024, 6 pages.

\* cited by examiner

SCALABLE IMPLEMENTATIONS OF EXACT DISTINCT COUNTS AND MULTIPLE EXACT DISTINCT COUNTS IN DISTRIBUTED QUERY PROCESSING SYSTEMS

CROSS-REFERENCE TO RELATED APPLICATION(S)

This application is related to U.S. patent application Ser. No. 16/206,022, entitled "SCALABLE IMPLEMENTATIONS OF EXACT DISTINCT COUNTS AND MULTIPLE EXACT DISTINCT COUNTS IN DISTRIBUTED QUERY PROCESSING SYSTEMS," filed on the same day herewith, now patented as U.S. Pat. No. 11,263,202, granted on Mar. 1, 2022, the entirety of which is incorporated by reference herein.

BACKGROUND

In databases, counts of distinct identifiers/values return the number of unique values for a given field of the data. For very large input datasets, like big data, random partitioning of the data (e.g., round robin schemes) collects all the distinct values, when the number of distinct values is relatively small, in a hash table indexed by the keys, one per partition, and merges all hash tables to provide a result via cardinality. In other solutions, the data is partitioned on groups by keys, having high distinctness, and the value field. The data is then grouped by the keys/values and then counted—per partition and then summed.

In performing multiple counts of different distinct identifiers/values on the same input dataset, each count of a distinct value is done separately, then the different results are combined with a group by keys operation. Such operations require an extra partition of the data in addition to having a partition for each different count. That is, one partition for each of the counts and one partition for a final count are required to combine the results together.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Scalable implementations of exact distinct counts and multiple exact distinct counts in distributed query processing systems are implemented via systems and devices. Distinct counts and multiple exact distinct counts for identifiers/values are performed based on keys. For distinct counts, datasets including data fields are sorted by values of fields and divided into balanced partitions in distributed servers. Subsets of fields with the same value are partitioned together. Key presence is determined for subsets on each partition, and the number of instances for the key are aggregated for exact distinct counts of values. For multiple distinct counts, fields of a dataset are combined by un-pivoting field columns. Compound keys are generated for combined fields from field identifiers of the combined fields and values of another field. Totals of unique values of the combined fields are determined for values in a counted field based on the compound keys. Finally the results are pivoted back to get the distinct value counts for individual fields.

Further features and advantages, as well as the structure and operation of various examples, are described in detail below with reference to the accompanying drawings. It is noted that the ideas and techniques are not limited to the specific examples and/or specific systems, platforms and languages described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
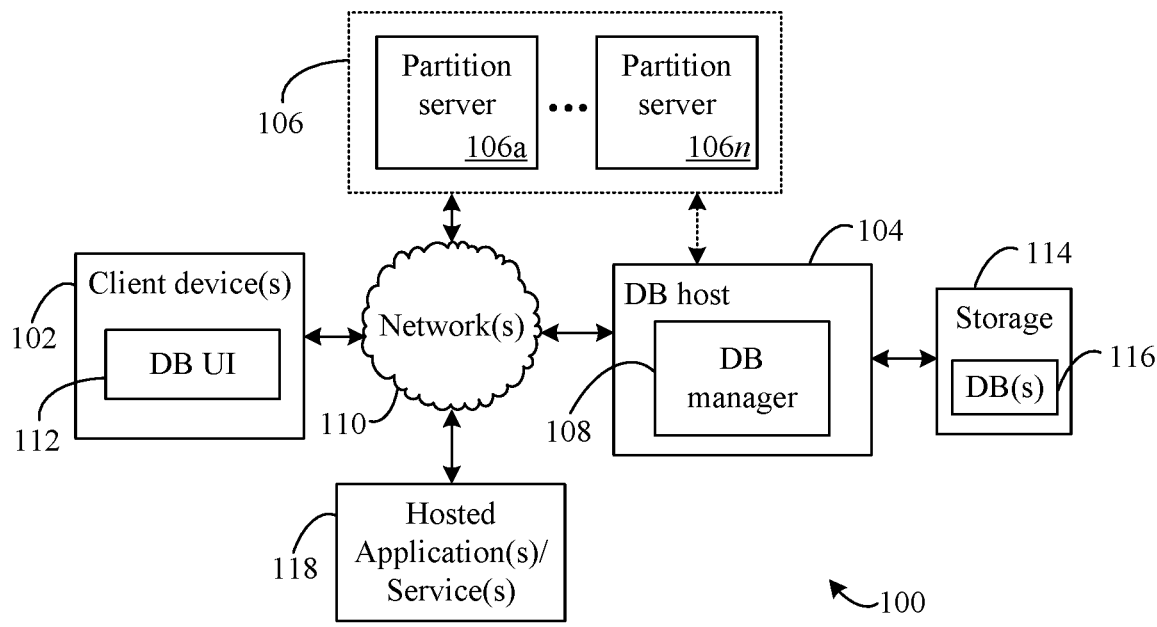
FIG. 1 shows a block diagram of a networked system for scalable implementations for exact counts of distinct values in distributed query processing systems, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for scalable implementations of exact distinct counts and multiple exact distinct counts in distributed query processing systems. Section II.A includes examples for exact distinct counts, and Section II.B provides examples for exact multiple distinct counts. Section III below describes example computing device embodiments that may be used to implement features of the embodiments described herein. Section IV below describes additional examples and advantages, and Section V provides some concluding remarks.

II. Example Embodiments

Scalable implementations of exact distinct counts and multiple exact distinct counts in distributed query processing systems are implemented via systems and devices. Distinct counts and multiple exact distinct counts for identifiers/values are performed based on keys. A key(s) may be a value of a field(s) in a dataset for which counts of values are associated. For distinct counts, datasets with data fields are sorted by values of a field and divided into balanced partitions in distributed servers where subsets of fields with the same value are partitioned together. Key presence is determined for the subsets on each partition, and the number of instances for the key are aggregated for exact distinct counts of values. For multiple distinct counts, two or more fields of a dataset are combined by un-pivoting field columns in the dataset. Compound keys having two or more portions are generated for the combined fields from field identifiers of the combined fields and values of another field. Totals of unique values of the combined fields are determined for values in a counted field based on the compound keys.

As used herein, an identifier in a field may be synonymous with a value in a field. For example, a field in a dataset may include the names of users. Thus, this field may include identifiers of users, while at the same time, each of the identifiers has a value where identifiers/values may have multiple instances in the field. Accordingly, for embodiments described herein, examples that refer to values in fields for description and illustration are also contemplated as being equivalently applicable to identifiers in the fields.

It is also contemplated herein that while some embodiments may be described in association with certain database server implementations, the embodiments described are applicable to, and may be adapted to, any type of database server regardless of syntax or implementation-specific details thereof.

When the set of distinct keys in a dataset is small compared to the number of distinct identifiers or values in a field of the dataset, scalability is problematic as vastly increasing amounts of memory and processing time are required to avoid skewed partitions that arise due to the low distinctness of the keys. That is, with a low distinctness of keys, many cases arise in which one key will have a much greater number of instances in the dataset than others. This causes an imbalance, or skew, in the size of partitions of data when partitioning over keys to determine exact, distinct counts of identifiers/values. This problem is further exacerbated as the size of datasets increases up to and including big data stores, or stores of data that are too large for traditional solutions to be applied for data analysis.

The embodiments herein provide novel solutions to these problems that not only determine exact, distinct counts and multiple counts of identifiers/values, but also performs such counts in ways that increase system efficiency, reduce memory footprints and processing, and provided for balancing of memory allocation to prevent skewing. For instance, in case of low distinctness of keys and high distinctness of identifiers/values in datasets, partitioning is performed for the data over the identifiers/values for which a distinct count is desired. A distinct count is calculated normally in each of the identifier/value-sorted partitions, and then the results are summed together to determine the final result.

In cases for multiple distinct counts, where counts are requested with the same keys but on different identifiers/values, tables of data from the dataset are expanded into a linear form using an unpivot, or an analogous unpivot-like operation, to provide for input blending of the data with a unique index for each column in the field. Subsequently, a distinct count is performed including the unique index as an additional key for the count. The results of the distinct count are summed on the original keys, and the result is projected out based on the unique index value to obtain the final result which is counts of distinct values for each of the columns.

In other words, the embodiments herein provide for scalable implementations of exact distinct counts and multiple exact distinct counts in distributed query processing systems including when keys have low distinctness compared to the identifiers/values by partitioning on the identifiers/values instead of on the keys, and when multiple distinct counts are requested on the same dataset by performing all counts in one computation by flattening the data for calculating multiple distinct counts to simplify distributed execution plans. These and further embodiments are described in greater detail as follows.

Systems and devices may be configured in various ways for scalable implementations of exact distinct counts and multiple exact distinct counts in distributed query processing systems. For instance, FIG. 1 is a block diagram of a computing system 100 ("system 100" hereinafter), according to embodiments. System 100 is configured to enable scalable implementations for exact counts of distinct identifiers/values in distributed query processing systems, according to embodiments. As shown in FIG. 1, system 100 includes a client device 102, a database (DB) host 104, and a distributed server group 106, which may communicate with each other over a network 110. System 100 also includes a hosted application(s)/service(s) 118 that may be associated with a DB/dataset. It should be noted that any numbers of client devices, DB hosts, and/or distributed server groups may be present in various embodiments. Additionally, any combination of the components illustrated in FIG. 1 may be present in system 100, according to embodiments.

As noted above, client device 102, DB host 104, and distributed server group 106 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

DB host 104 may comprise one or more server computers or computing devices, which may include one or more distributed or "cloud-based" servers. In embodiments, DB host 104 may be associated with, or may be a part of, a cloud-based service platform such as Microsoft® Azure® from Microsoft Corporation of Redmond, WA DB host 104 may be configured to include multiple logical processing partitions for performing scalable implementations of exact distinct counts and multiple exact distinct counts in distributed query processing systems.

DB host 104 may include a storage 114, that may be internal or external (as shown) to DB host 104, and that stores one or more databases (DB(s)) 116 against which queries may be performed according to the described embodiments herein, including by not limited to queries based on distinct counts for identifiers/values in datasets stored in DB(s) 116. Storage 114 may be any type of storage device or array of devices, and while shown as being communicatively coupled to DB host 104 outside of network 110, storage 114 may be networked storage that is accessible via network 110.

Hosted application(s)/service(s) 118 may be one or more of any type of application and/or service for which DB(s) 116 is associated. For example, hosted application(s)/service(s) 118 may be one or more applications and/or services hosted by Microsoft® Azure®. DB(s) 116 for hosted application(s)/service(s) 118 may include datasets storing data associated therewith, including but not limited to, user account information, a log entry dataset storing data for all accesses of different users, sales information, and/or the like. In embodiments, hosted application(s)/service(s) 118 may also include applications and/or services that are stand-alone rather than hosted.

Client device 102 may be any type of computing device or computing system, including a terminal, a personal computer, a laptop computer, a tablet device, a smart phone, a personal digital assistant, and/or the like that may be utilized to query a database. In embodiments, client device 102 may be used by an administrator, support staff, customers, and/or clients associated with datasets stored in DB(s) 116. Queries to DB(s) 116 may be performed via DB host 104 and/or via a DB user interface (UI) 112 of client device 102. DB UI 112 may include one or more components to enable a user thereof to provide queries/requests, e.g., queries for distinct counts and/or multiple distinct counts, according to embodiments. An instance of DB UI 112 may be present in DB host 104 in some embodiments.

Client devices and DB hosts described herein may be configured to execute software applications/services for querying databases and for scalable implementations for exact counts of distinct values and counts of multiple distinct values in distributed query processing. For example, a DB manager 108 may be a software application/service so configured. As illustrated, DB host 104 may include an instance of DB manager 108. DB manager 108 may be a part of an operating system (OS), a database server package, and/or an application installed at a computing system, may be an application/service itself, etc., in various embodiments. DB manager 108 is configured to perform scalable operations for determining exact distinct counts and multiple distinct counts, as described in further detail herein.

For example, when a query is provided to DB host 104 from client device 102 for execution against a DB(s) 116, DB manager 108 may be configured to receive the incoming query and determine an exact distinct count and/or multiple distinct counts for a dataset in DB(s) 116. The determination of exact distinct count and multiple distinct counts may be performed against one or more datasets stored in DB(s) 116, and may be based on keys in the datasets that are specified by the queries.

For instance, a log entry dataset may include data for accesses of different users to cloud-based services/applications. A query may specify that an exact distinct count of users be performed on the log entry dataset. An exact count of distinct users that accessed one of the services/applications (as the key) may be determined efficiently via DB manager 108, even for big data storage with billions or hundreds of billions of raw data log entries. In another example, the log entry dataset may also include a tenant field with tenant identifiers for the different users of the cloud-based services/applications. A query may specify in a single call that a distinct count for multiple identifiers be performed on the log entry dataset, such as, multiple distinct counts of users and tenants that have accessed the services/applications (as the key). An exact count of both distinct user and distinct tenant accesses may be efficiently determined for the key via DB manager 108 even when the log entry dataset comprises big data.

DB manager 108 may be implemented in hardware, hardware combined with one or both of software and/or firmware, and/or as program instructions encoded on computer-readable storage media, and may be configured to perform any functions and/or operations described herein associated with scalable implementations of exact distinct counts and multiple exact distinct counts in distributed query processing systems are implemented via systems and devices. In embodiments, an instance of DB manager 108 may be implemented in distributed server group 106. In such an example, distributed server group 106 may receive queries from DB host 104 and/or client device 102 according to embodiments herein. Additionally, one or more portions of DB manager 108 may be distributed or duplicated between DB host 104 and distributed server group 106 in various scalable implementation examples.

Distributed server group 106 may comprise one or more server computers, e.g., partition servers 106a-106n, or other computing devices noted herein, which may include one or more distributed or "cloud-based" servers, and which may be logically independent. In embodiments, distributed server group 106 may be associated with, or may be a part of, a cloud-based service platform such as Microsoft® Azure® from Microsoft Corporation of Redmond, WA Distributed server group 106 and partition servers 106a-106n may receive and store partitions of datasets from DB(s) 116 on which operations for scalable implementations of exact distinct counts and multiple exact distinct counts may be performed, as described herein. Partition servers 106a-106n are logically separate from each other, according to embodiments.

It should be noted that as described herein, embodiments of DB host 104 and/or distributed server group 106 are applicable to any type of system architecture in which datasets, including very large datasets like big data, are queried for exact distinct counts and multiple distinct counts. One example noted above is where distributed server group 106 is a "cloud" implementation or service in a network architecture/platform. A cloud platform may include a networked set of computing resources, including servers, routers, etc., that are configurable, shareable, provide data security, and are accessible over a network, such as the Internet. Cloud implementations/services for embodiments may run on these computing resources, often atop operating systems that run on the resources, for entities that access the implementations/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Figure 2:
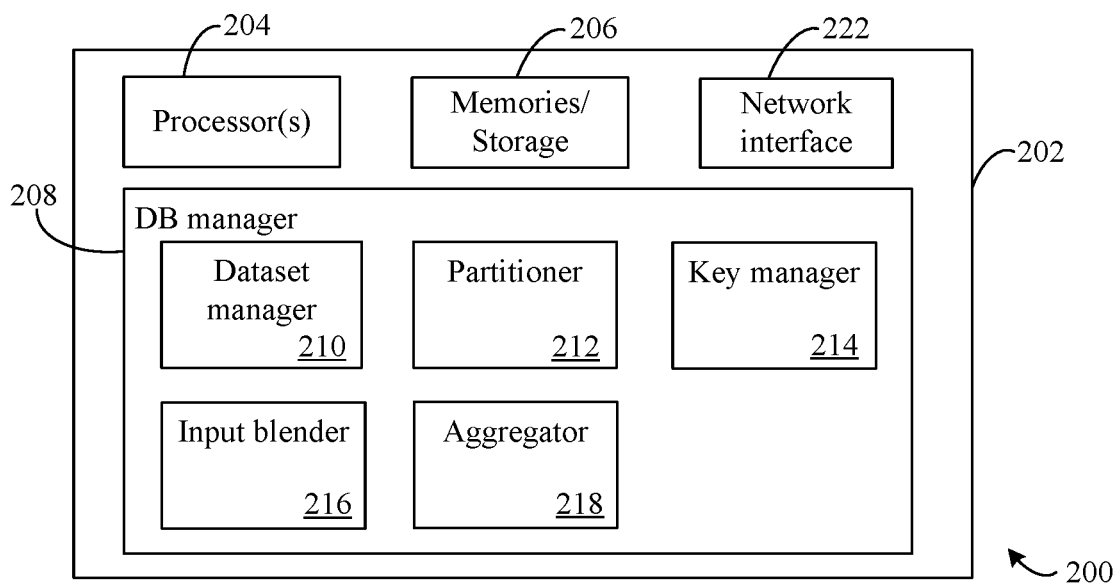
FIG. 2 shows a block diagram of a system for scalable implementations for exact counts of distinct values in distributed query processing systems, according to an example embodiment.

Accordingly, a processing system such as DB host 104 may be configured in various ways for improvements and enhancements in scalable implementations of exact distinct counts and multiple exact distinct counts in distributed query processing systems. For example, FIG. 2 is a block diagram of a system 200 configured for such improvements and enhancements. System 200 may be an embodiment of system 100 of FIG. 1, e.g., DB host 104 and/or distributed server group 106. System 200 is described as follows.

System 200 includes a computing device 202, which may be an embodiment of DB host 104 of FIG. 1, and may be any type of server or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 226, and a DB manager 208 that may be an embodiment of DB manager 108 of FIG. 1. System 200 may also include additional components (not shown for brevity and illustrative clarity) including, but not limited to, components and subcomponents of other devices and/or systems herein, as well as those described below with respect to FIG. 10, such as an operating system, etc.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories (e.g., a cache for query processing), remote processors or memories, and/or distributed processors or memories. Processor 204 may be a multi-core processor configured to execute more than one processing thread concurrently. Processor 204 comprises circuitry that is configured to execute computer program instructions such as but not limited to embodiments of DB manager 208, which may be implemented as computer program instructions for scalable implementations of exact distinct counts and multiple exact distinct counts in distributed query processing systems, etc., as described herein. Memory 206 may include storage 114 of FIG. 1, and may be configured to store such computer program instructions/code, as well as to store other information and data described in this disclosure including, without limitation, DBs of DB(s) 116 of FIG. 1, e.g., big data stores, etc.

Network interface 226 may be any type or number of wired and/or wireless network adapter, modem, etc., configured to enable system 200 to communicate with other devices over a network, such as communications between system 200 and other devices utilized in a network as described herein (e.g., client device 102, DB host 104, and/or distributed server group 106) over a network such as network 110 as described above with respect to FIG. 1.

DB manager 208 includes a plurality of components for performing the functions and operations described herein for scalable implementations of exact distinct counts and multiple exact distinct counts in distributed query processing systems. For instance, DB manager 208 may receive and parse queries or information related thereto for a dataset, and in response, determine an exact distinct count or multiple distinct counts of values of fields in the dataset based on keys. As shown, DB manager 208 includes a dataset manager 210, a partitioner 212, a key manager 214, an input blender 216, and an aggregator 218. While shown separately for illustrative clarity, in embodiments, one or more of dataset manager 210, partitioner 212, key manager 214, input blender 216, and/or aggregator 218, may be combined together and/or as a part of other components of system 200. In some embodiments, less than all of the components of DB manager 208 illustrated in FIG. 2 may be included. In software implementations, one or more components of DB manager 208 may be stored in memory 206 and are executed by processor 204.

Dataset manager 210 may be configured to access datasets to which queries are directed for counts. Dataset manager 210 may also be configured to provide datasets, or portions thereof, to logical partitions of processing devices such as computing device 202 and/or to distributed server group 106 of FIG. 1, according to embodiments. Partitioner 212 may be configured to shuffle, or partition, datasets amongst the logical partitions and/or partitions servers 106a-106n of distributed server group 106, as described in further detail below. Partitioner 212 may be configured to balance partitions of datasets to avoid, or reduce, skewing.

Key manager 214 may be configured to generate, or specify, and associate keys, including compound keys, with identifiers/values of fields in datasets. Key manager 214 may be configured to generate or specify keys based on features of received queries. Input blender 216 may be configured to blend data of input datasets associated with queries. That is, when a query specifies a dataset on which to operate, that dataset is the input for the operations designated in the query. Blending data may include pivot/unpivot operations, combining fields of data, generating new temporary fields of data, and/or the like. Aggregator 218 may be configured to aggregate information and perform counts, as described for embodiments herein.

Accordingly, DB manager 208 may operate in various ways to enable improvements in scalable implementations of exact distinct counts and multiple exact distinct counts in distributed query processing systems. Additional details regarding DB manager 208 and its components are provided below.

A. Example Embodiments for an Exact Distinct Count

Systems and devices may be configured in various ways for scalable implementations of exact distinct counts in distributed query processing systems.

Figure 3:
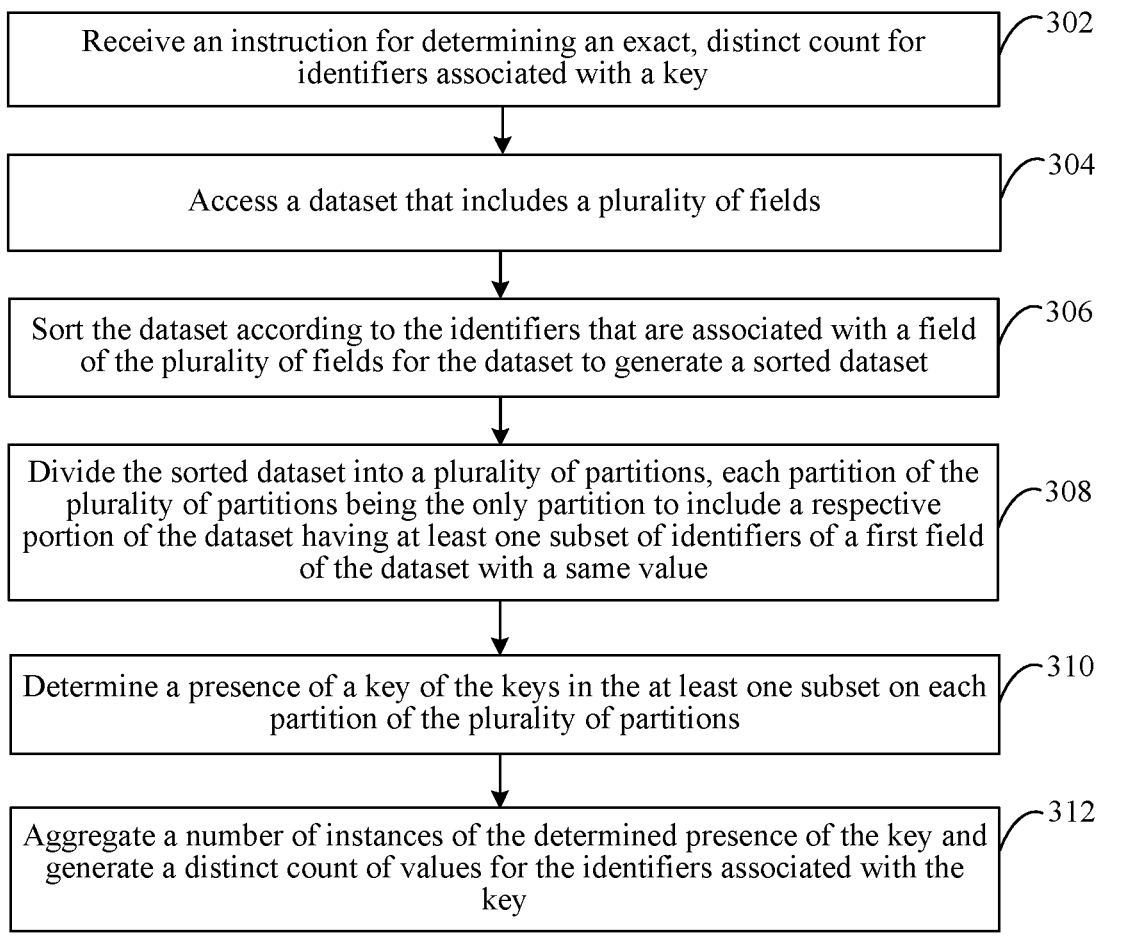
FIG. 3 shows a flowchart for scalable implementations for exact counts of distinct values in distributed query processing systems, according to an example embodiment.
Figure 4:
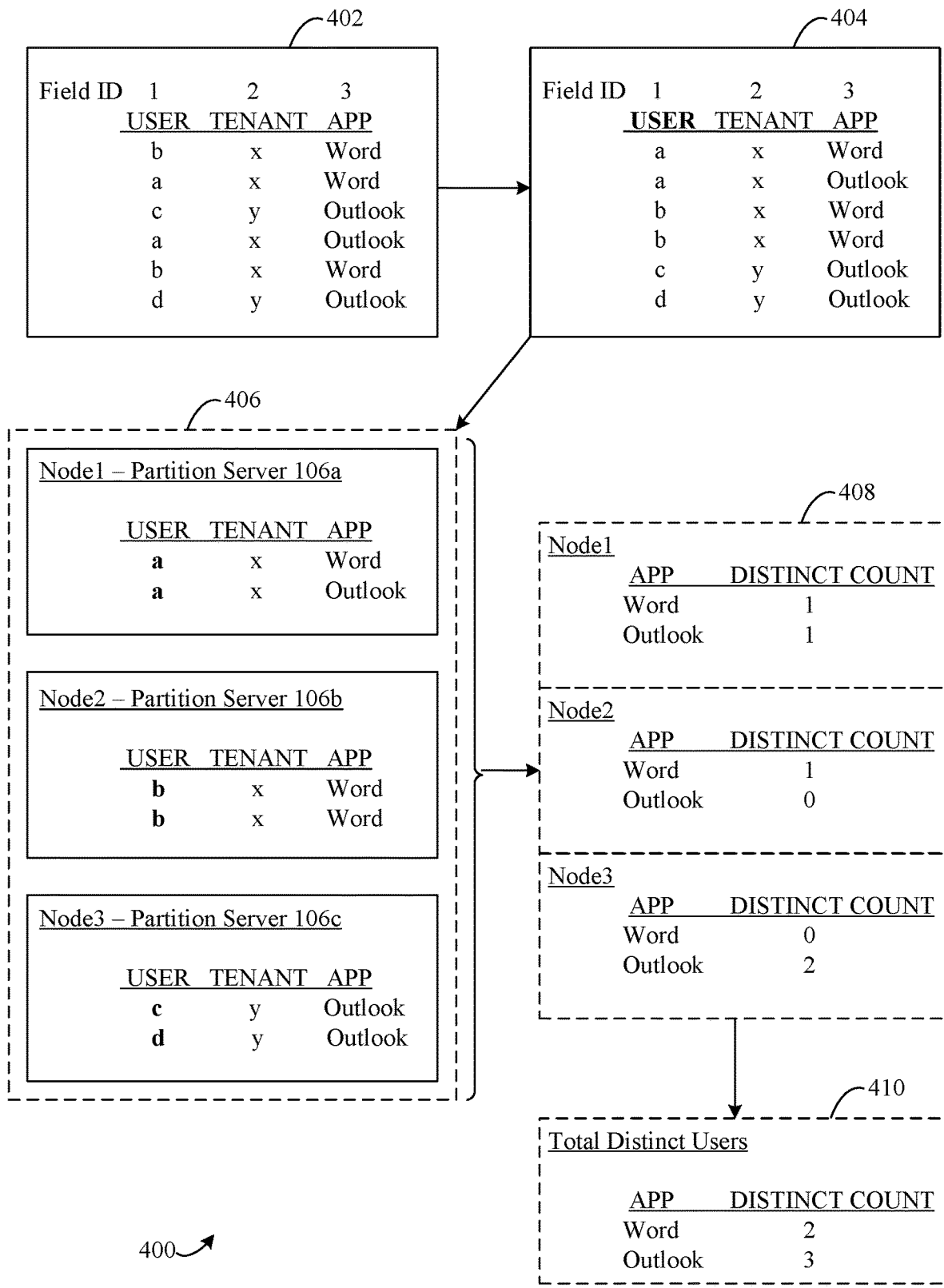
FIG. 4 shows a flow diagram for scalable implementations for exact counts of distinct values in distributed query processing systems, according to an example embodiment.

For instance, FIG. 3 and FIG. 4 will now be described. FIG. 3 shows a flowchart 300 and FIG. 4 shows a flow diagram 400 for scalable implementations of exact distinct counts and multiple exact distinct counts in distributed query processing systems, according to example embodiments. DB manager 208 may operate according to flowchart 300 and flow diagram 400, in embodiments. Further structural and operational examples will be apparent to persons skilled in the relevant art(s) based on the following description.

Flowchart 300 and flow diagram 400 are described as follows with respect to system 100 of FIG. 1 and system 200 of FIG. 2.

Flowchart 300 begins at step 302. In step 302, an instruction for determining an exact, distinct count for identifiers associated with a key is received. For example, computing device 202 and/or DB manager 208 of system 200 in FIG. 2 may be configured to receive incoming queries to be run against datasets in DB(s) 116 of FIG. 1. Incoming queries may specify a distinct count for a specific identifier/value over a key, and may be received over network 110 from client device 102 of FIG. 1. In embodiments, queries may be generated at DB host 104, computing device 202, or any other type of computing device described herein.

With respect to the example embodiments in flowchart 300 and flow diagram 400, the query received may be for a distinct count of users that includes applications accessed as the key.

In step 304 of flowchart 300, a dataset that includes a plurality of fields is accessed. For instance, dataset manager 210 may be configured to access the dataset specified in the query received in step 302. Dataset manager 210 may access the dataset in storage 114, either directly or via network 110, in embodiments. Once accessed, the dataset may be processed, retrieved, and/or distributed by dataset manager 210.

Referring also to flow diagram 400, in step 402, an example dataset is accessed by dataset manager 210. Datasets may include field identifiers (IDs) for fields of the dataset, the fields themselves, and identifiers/values for the data in the fields. As exemplarily shown, the illustrated dataset for user accesses to hosted applications includes Field IDs 1, 2, and 3, for fields User, Tenant, and Application (App), respectively. Users a, b, c, and d have their accesses represented, and the users are also identified by their associated tenants (x and y) for the applications (shown as Microsoft® Word and Outlook®).

In step 306 of flowchart 300, the dataset is sorted according to the identifiers that are associated with a field of the plurality of fields for the dataset to generate a sorted dataset. For example, partitioner 212 may be configured to sort datasets. Partitioner 212 may sort datasets based on identifiers/values associated with fields in the datasets. In embodiments, partitioner 212 may sort a dataset based on specified fields in the query received in step 302. In embodiments, datasets may be sorted according to a field(s) on which a distinct count is to be performed. Sorting may be performed on the dataset in its storage (e.g., storage 114), on an instance of the dataset in its storage, in memory of DB host 104, or in memory 206 of computing device 202, and/or the like.

In flow diagram 400, step 404 shows the dataset accessed in step 402 subsequent to sorting by partitioner 212. As noted above, the query received in step 302 may specify a distinct count of users that includes applications accessed as the key. Accordingly, partitioner 212 has sorted the dataset according to the User field in alphabetical order.

In step 308 of flowchart 300, the sorted dataset is divided into a plurality of partitions, each partition of the plurality of partitions being the only partition to include a respective portion of the dataset having at least one subset of identifiers of a first field of the dataset with a same value. For instance, partitioner 212 may be configured to divide or shuffle the dataset into partitions, as described herein. The division into partitions may be performed such that partitions are balanced for the numbers of rows in the partitions to avoid skewing. The partitioned portions of the dataset are then provided to distributed servers or to separate logical processing partitions for processing.

Step 406 of flow diagram 400 illustrates the dividing of the dataset into partitions for step 308 of flowchart 300 in the context of distributed server group 106. As shown, three partition servers of distributed server group 106 are provided with partitions (partition server 106a as Node1, a partition server 106b as Node2, and a partition server 106c as Node3) because partitioner 212 has divided the dataset into three partitions based on the sorting by User identifier/value. It should be noted that the partitioning is performed so that each subset of the User field in each partition includes each instance of its associated identifiers/values. For example, the first partition on Node1 is the only partition with rows having User 'a', just as the second partition on Node2 is the only one to include User 'b' and the third partition on Node3 is the only partition to include User 'c' and User 'd'.

In another example, User 'c' could be included in the partition on Node1 and User 'd' could be included in the partition on Node2, if no other partitions are created to include rows of data for User 'c' and User 'd'. In other words, any allocation of rows or subsets of the dataset may be used for partitioning as long as a given identifier/value for the field on which the sort is performed, as in step 306, is only present in a single partition. Additionally, other numbers of partitions, more or fewer, may be used.

In step 310 of flowchart 300, a presence of a key of the keys is determined in the at least one subset on each partition of the plurality of partitions. For instance, key manager 214 may be configured to designate the key(s) for a count operation based on the query received in step 302. In the illustrated example, the application accessed serves as the key and is so designated by key manager 214. The subsets of the dataset in each partition are then processed by aggregator 218 to determine if identifiers/values of the designated key are present for any rows associated with different users.

In step 312 of flowchart 300, a number of instances of the determined presence of the key is aggregated and a distinct count of values is generated for the identifiers associated with the key. For example, aggregator 218 may be configured to aggregate the number of determined key presence for the key in each group of user rows in the partitioned dataset. This aggregation provides the number of distinct users that have accessed the applications for that subset of the dataset. Accordingly, a per-partition result for these distinct counts is revealed based on the presence of the key for each user.

In flow diagram 400, an example of the per-partition result is shown in step 408. For example, a distinct count for Node1 is determined as one distinct user for Word and one distinct user for Outlook®. This is determined as such by aggregator 218 because in the first partition of the log entry dataset, User 'a' accessed both applications. It should be noted that had User 'a' accessed either application additional times, the result would not change because the query was for a distinct count of users for the applications. As an illustration of this concept, aggregator 218 determines from the partition at Node2 a distinct user count of one for Word (i.e., in this partition for the key (APP), which only includes Word), there was only a single unique user, User V. While in Node3, aggregator 218 determines a distinct user count of 2 for Outlook® in this partition because both User 'c' and User 'd' each accessed the application.

Subsequent to determining the distinct counts for the identifiers/values on the specified key for each partition, the per-partition counts may be collected to determine final distinct counts over the entire dataset. For instance, flow diagram 400 shows in step 410 a final result of the exact, distinct user count for the entire dataset. The final result may be determined by aggregator 218, in embodiments.

As shown above, rather than partitioning by key and searching for users which leads to skewing and memory/resource shortages, the embodiments herein provide for efficient ways to partition by user and search by key. That is, in contrast to conventional approaches, the described embodiments balance memory usage, and efficiently use memory in a way so that exact distinct counts can actually be performed across entire datasets, such as big data stores with billions or hundreds of billions of entries, using existing memory resources.

Figure 5:
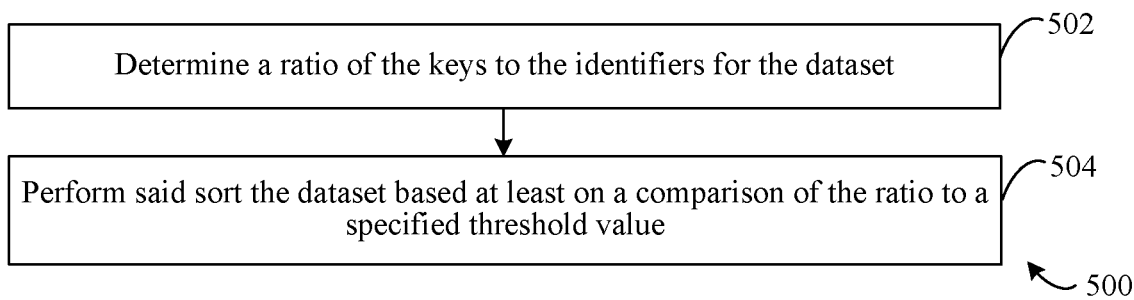
FIG. 5 shows a flowchart for scalable implementations for exact counts of distinct values in distributed query processing systems, according to an example embodiment.

Turning now to FIG. 5, it is contemplated herein that performance of one or more embodiments may be predicated on low distinctness of keys versus high distinctness of identifiers/values in datasets. That is, in datasets with high numbers of identifiers/values for a given field on which distinct counts are desired, and with relatively lower numbers of key identifiers/values, the embodiments herein may be more advantageously performed.

In FIG. 5, a flowchart 500 is shown for scalable implementations of exact distinct counts and multiple exact distinct counts in distributed query processing systems, according to an example embodiment. DB manager 208 may operate according to flowchart 500 which may be a further embodiment of flowchart 300 of FIG. 3. Further structural and operational examples will be apparent to persons skilled in the relevant art(s) based on the following description. Flowchart 500 is described as follows with respect to system 100 of FIG. 1 and system 200 of FIG. 2.

Flowchart 500 begins at step 502. In step 502, a ratio of the keys to the identifiers for the dataset is determined. The ratio may be determined by one or more components of DB manager 208, by another component of system 200, by administrators of system 200 and/or DBs 116, and/or the like.

In step 504, the sort of the dataset is performed based at least on a comparison of the ratio to a threshold value. For instance, a threshold value may be predetermined or dynamically determined for a given dataset (e.g., as the dataset is updated) as the point at which sorting the dataset according to the embodiments herein, such as in step 306 of flowchart 300, is performed.

In embodiments, ratios for distinct keys to distinct identifiers/values may be thousands or less to millions or more, although other ratios may be defined.

B. Example Embodiments for Exact Multiple Distinct Counts

Systems and devices may also be configured in various ways for scalable implementations of exact multiple distinct counts in distributed query processing systems.

Figure 6:
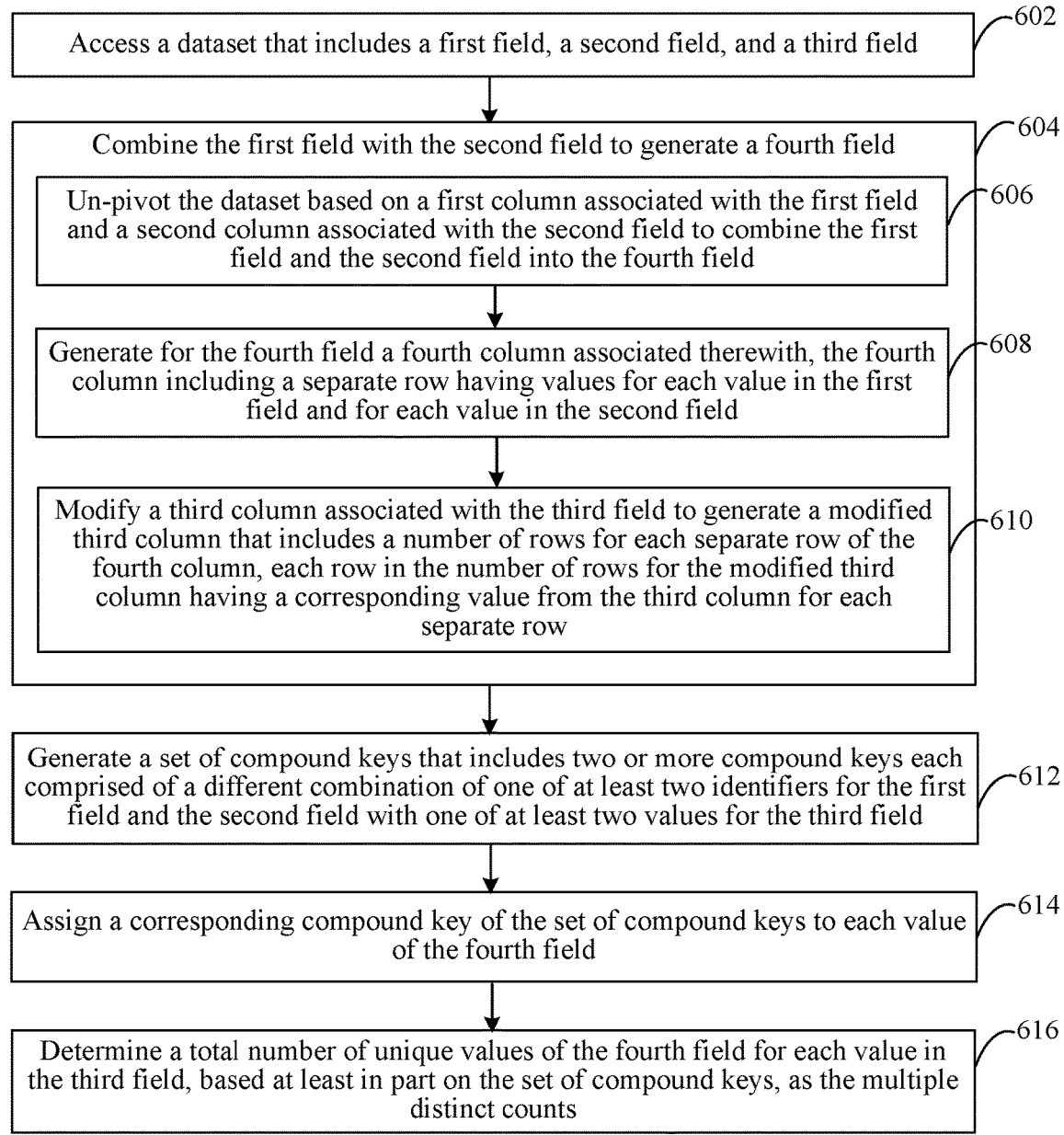
FIG. 6 shows a flowchart for scalable implementations for exact counts of distinct values in distributed query processing systems, according to an example embodiment.
Figure 7:
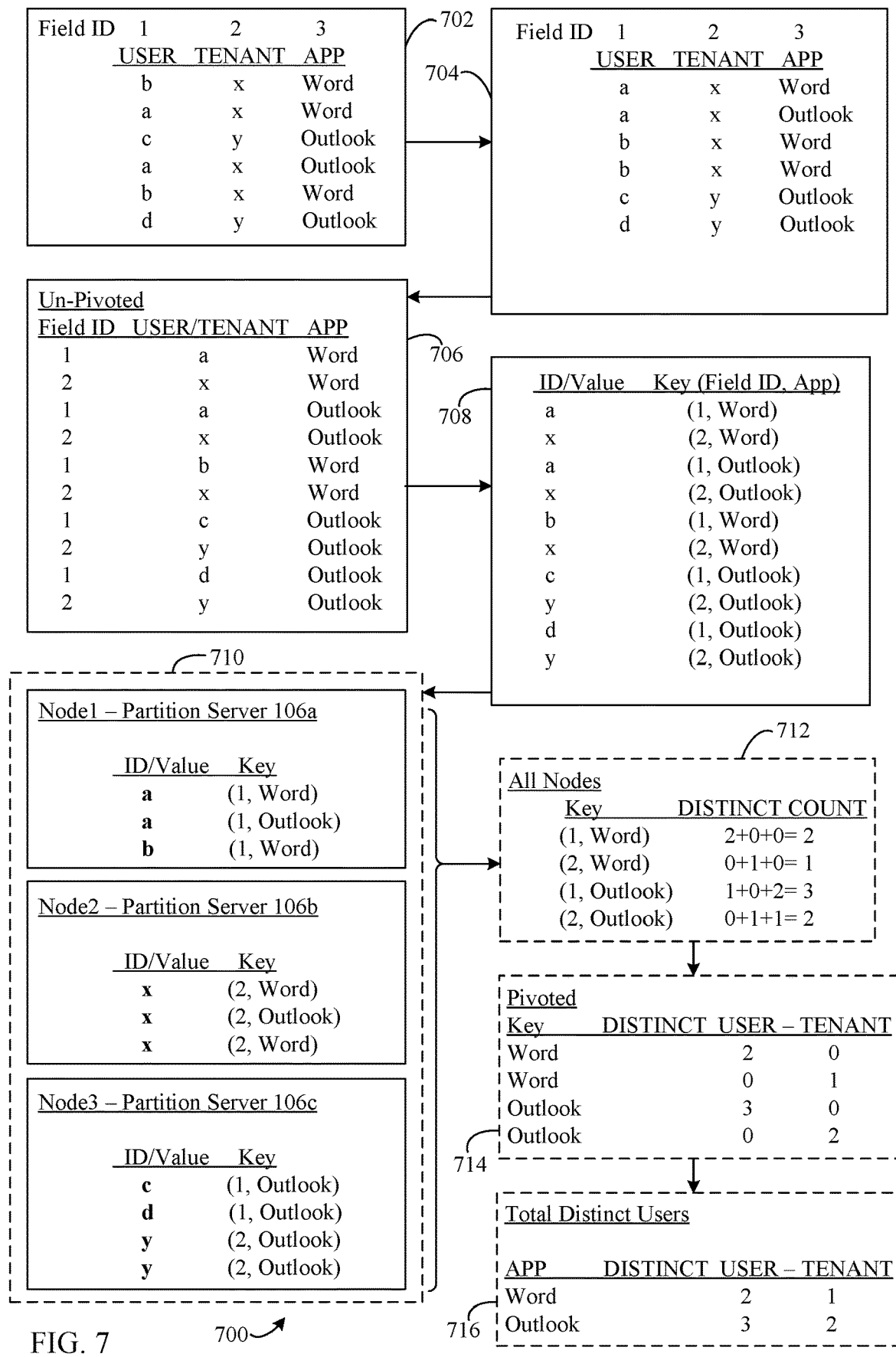
FIG. 7 shows a flow diagram for scalable implementations for exact counts of distinct values in distributed query processing systems, according to an example embodiment.

For instance, FIG. 6 and FIG. 7 will now be described. FIG. 6 shows a flowchart 600 and FIG. 7 shows a flow diagram 700 for scalable implementations of exact distinct counts and multiple exact distinct counts in distributed query processing systems, according to example embodiments. DB manager 208 may operate according to flowchart 600 and flow diagram 700, in embodiments. Further structural and operational examples will be apparent to persons skilled in the relevant art(s) based on the following description.

Flowchart 600 and flow diagram 700 are described as follows with respect to system 100 of FIG. 1 and system 200 of FIG. 2.

Flowchart 600 begins at step 602. In step 602, a dataset that includes a first field, a second field, and a third field is accessed. For instance, dataset manager 210 of DB manager 208 in system 200 may be configured to access a dataset that includes one, two, three, or more fields. Dataset manager 210 may access the dataset in storage 114, either directly or via network 110, in embodiments. Once accessed, the dataset may be processed, retrieved, and/or distributed by dataset manager 210.

The access to the dataset may be triggered by receipt of a query specifying the dataset and an operation to be performed thereon as described herein. With respect to the example embodiments in flowchart 600 and flow diagram 700, the query received may be for may specify multiple distinct counts for two specific identifiers/values over a key, e.g., multiple distinct counts of users and tenants that specifies applications accessed as the key. As in the preceding subsection, computing device 202 and/or DB manager 208 may be configured to receive incoming queries over network 110, as well as queries generated at DB host 104, computing device 202, and/or any other type of computing device described herein.

Referring also to flow diagram 700, in step 702, an example dataset is accessed by dataset manager 210. Datasets may include field identifiers (IDs) for fields of the dataset, the fields themselves, and identifiers/values for the data in the fields. As exemplarily shown, the illustrated dataset for user accesses to hosted applications includes Field IDs 1, 2, and 3, for fields User, Tenant, and Application (App), respectively. Users a, b, c, and d have their accesses represented, and the users are also identified by their associated tenants (x and y) for the applications (shown again as Microsoft® Word and Outlook®). In step 704 of flow diagram 700, the dataset may be sorted by partitioner 212, as similarly described above in step 306 of flowchart 300 (and step 404 of flow diagram 400), such as being sorted according to a fields on which multiple distinct counts are to be performed. As illustrated, step 704 shows sorting by the User field because the User field is specified for one of the distinct counts in the query for this example, although the dataset could be sorted according to tenant in the example.

In embodiments, partitioner 212 may be configured to sort datasets according to the specified field to be counted which has greater distinctness than other fields specified to be counted. Here, it would be common for each tenant to have at least one or more users, thus partitioner 212 sorts based on the User field.

In step 604 of flowchart 600, the first field is combined with the second field to generate a fourth field. For instance, input blender 216 may be configured to combine fields of a dataset to generate new fields and/or new instances of fields. The combined first and second fields may be those fields specified for counting in the query for multiple distinct counts, according to embodiments. As an example, the User and Tenant fields may be combined or blended to generate a fourth User/Tenant field.

Referring also to flow diagram 700, step 706 shows an example of the dataset, or an instance thereof, subsequent to input blender 216 generating the fourth User/Tenant field via combination of the User and Tenant fields. In embodiments, step 604 of flowchart 600 may include additional steps as shown in FIG. 6.

For instance, in step 606 of flowchart 600, the dataset is un-pivoted based on a first column associated with the first field and a second column associated with the second field to combine the first field and the second field into the fourth field. As an example, to generate the fourth field by combining the first and second files, input blender 216 may be configured to un-pivot the dataset and create rows for the fourth field based on the columns of the first field and the second field. That is, embodiments herein utilize un-pivoting, rather than slicing the rows to extract data, to improve system efficiency (e.g., reducing memory and processor usage) for performing these operations while generating a table of data from the dataset by which a single distinct count can be performed to achieve the result of a multiple distinct count.

As an example, the un-pivoting of the dataset transforms the data therein by increasing the number of rows, and decreasing the number of columns, used to represent the data. Increasing the number of rows for the blended data provides for more distribution of the data, e.g., via dividing the data into partitions, thus allowing for more balanced memory allocation and more efficient use of processing cycles in determinations of distinct counts, especially in very large datasets. Accordingly, un-pivoting combined with partitioning on identifiers/values to be distinctly counted, provides even greater efficiency for using system resources.

In step 608 of flowchart 600, a fourth column is generated for the fourth field associated therewith, the fourth column including a separate row having values for each value in the first field and for each value in the second field. For instance, as noted above, input blender 216 may be configured to generate the fourth field, and to generate a fourth column for the fourth field. The fourth column may include a separate row having values for each value in the first field and for each value in the second field.

Referring again to step 706 of flow diagram 700, the rows of the fourth field, i.e., the User/Tenant field, are illustrated. The fourth column of data for the User/Tenant field includes a row for each value of the User field and of the Tenant field shown in step 704 of flow diagram 700. For example, the first row spanning the User and Tenant columns in step 704 of flow diagram 700 includes User 'a' and Tenant 'x', whereas the first row of the fourth field User/Tenant in step 706 includes User/Tenant 'a' and the second row of the fourth field User/Tenant in step 706 includes User/Tenant 'x'. In other words, the two columns of the dataset are un-pivoted into two rows.

In step 610 of flowchart 600, a third column associated with the third field is modified to generate a modified third column that includes a number of rows for each separate row of the fourth column, each row in the number of rows for the modified third column having a corresponding value from the third column for each separate row. For instance, input blender 216 may be configured to modify the third column such that each row of the fourth column for the fourth field has its associated value in the modified third field/column. That is, each row in the dataset prior to combining the first and second fields includes two identifiers/values of the first and second fields associated with an identifier/value of the fourth field. Input blender 216 modifies the column of the third field to complete the associations between the first and second fields and the unmodified third field.

Referring again to step 706 of flow diagram 700, the third column of data for the third field (App) is shown as being modified to include a row for each value of the User/Tenant field. For example, the first row spanning the User and Tenant columns in step 704 of flow diagram 700 includes User 'a' and Tenant 'x' for App 'Word', whereas the first row of the fourth field User/Tenant in step 706 includes User/Tenant 'a' for App 'Word', and the second row of the fourth field User/Tenant in step 706 includes User/Tenant 'x' for App 'Word'. Here, the un-pivoting for the two combined columns of the dataset into two rows is completed.

Also shown in step 706 is the un-pivoted Field ID, e.g., alphanumeric identifiers that uniquely identify the fields of the dataset. The Field ID may be considered a field itself or its alphanumeric identifiers may be considered as part of the fields they respectively identify, in embodiments. Accordingly, in step 604 or in one of its sub-steps of flowchart 600, the alphanumeric identifiers for the Field ID may be associated with each field that is combined. For example, in step 706 of flow diagram 700, the un-pivoted table includes a field for Field ID by which the Field ID from step 704 for the User and Tenant fields are associated with their corresponding rows in the User/Tenant field. Simply put, the User field had a Field ID of '1', so each User/Tenant row that specifies a user has a Field ID of '1', while each User/Tenant row that specifies a tenant has a Field ID of '2'.

In step 612 of flowchart 600, a set of compound keys is generated that includes two or more compound keys each comprised of a different combination of one of at least two identifiers for the first field and the second field with one of at least two values for the third field. For instance, key manager 214 may be configured to designate and/or generate the keys, including compound keys, for multiple distinct counts. Key manager 214 is configured to determine each different combination of two or more identifiers/values for the field of the dataset specified as the key (e.g., as specified in the query) with each identifier/value from the first and second fields specified to be counted (e.g., as specified in the query). In the illustrated example, the application accessed according to the App field serves as the first portion of a compound key, and the Field ID serves as the second portion of the compound key.

This is illustrated in step 708 of flow diagram 700. Step 708 shows the compound key combinations. In the example of flow diagram 700, the query for the dataset specifies two fields to count over the same key, e.g., a multiple distinct count operations. Here, the users and tenants are specified to be distinctly counted over applications as the key. However, embodiments herein take into account the un-pivoting of the dataset described above, and thus utilize a compound key having the application as well as the Field ID as part of the input blending. This flattens the data of the dataset into distributed rows and increases system efficiency while reducing system resource usage.

As noted above, compound keys may comprise each combination of the fields used therefor. In this simple example, there are two options for the type of application, i.e., two possible options for the first portion of the compound key, and there are two fields specified for counting, i.e., two possible options for the second portion of the compound key. Thus the set of compound keys for this example include four possible combinations: (1, Word), (2, Word), (1, Outlook), and (2, Outlook). Each identifier/value in the User/Tenant combined field matches to one of these compound key combinations.

In step 614 of flowchart 600, a corresponding compound key of the set of compound keys is assigned to each value of the fourth field. For instance, key manager 214 is configured to assign the compound keys of the set to their respective identifiers/values in the User/Tenant field. As noted above, each User/Tenant row that specifies a user has a Field ID of '1', while each User/Tenant row that specifies a tenant has a Field ID of '2', and thus the Field ID portion of a compound key can be matched to the User/Tenant rows along with the application portion for the compound key.

In step 708 of flow diagram 700, the assignments of compound keys to identifiers/values is shown for the User/Tenant field. It can be seen by comparison to field 706 and to field 704 that the assigned compound key for each row provides the correct association for the user or tenant present therein. However, through the input blending and data flattening described herein, the original table of data for the dataset has been compiled as a greater number of rows comprising a single identifier/value and a corresponding key. Accordingly, the processing required and complexity are reduced for multiple distinct count operations. That is, as noted above, sets of compound keys for multiple distinct counts on a key include each combination of the fields used to generate the keys, so an increased number of transformed rows for the dataset can be utilized in a single count operation. Further details regarding this aspect of the embodiments are described below.

In embodiments, the identifiers/values for the User/Tenant field and their associated compound keys in step 708 may be sorted, e.g., according to the identifiers/values as similarly described above, and then divided into partitions as shown in step 710 of flow diagram 700, and as described in further detail below.

In step 616 of flowchart 600, a total number of unique values of the fourth field is determined for each value in the third field, based at least in part on the set of compound keys, as the multiple distinct counts. For instance, aggregator 218 may be configured to determine distinct identifiers/values in the User/Tenant field for each compound key in the set of compound keys generated in step 612 of flowchart 600. In the context of the example for FIGS. 6 and 7, the numbers of unique identifiers/values are aggregated by aggregator 218 based on the compound keys to provide the total numbers for the multiple distinct counts of users and tenants with respect to the applications.

Step 712 of flow diagram 700 shows aggregation by aggregator 218 for each compound key over the distributed partitions of step 710. That is, aggregator 218 may determine a distinct count of users/tenants in step 712 for each combination of the compound keys over the utilized partition servers for the data shown in step 708. As illustrated in step 712, each combination of the compound keys is associated with an addend for each partition from which a total aggregation count is determined. For example, a distinct count of 2 for Node1 is determined on compound key (1, Word), while Node2 and Node3 have zero instances of users for this compound key. So the distinct user count across all partitions for (1, Word) is '2+0+0' which equals 2. The other compound key combinations are similarly determined. Accordingly, a per-partition result for the distinct count per key is found and aggregated for a total result.

In embodiments, the total results for each compound key may be pivoted as shown in step 714 of flow diagram 700. In step 716, the pivoted data of step 712 may be combined/aggregated into a single row for each application having a corresponding distinct count for users and for tenants. Additional details for embodiments for step 714 and step 716 are provided below.

As shown above, rather than partitioning by compound key and searching for users/tenants which leads to skewing and memory/resource shortages, the embodiments herein provide for efficient ways to partition by user/tenant and search by compound key where a portion of the compound key provides an indication of user or tenant. That is, in contrast to conventional approaches, the described embodiments balance memory usage, and efficiently use memory in a way so that exact multiple distinct counts can actually be performed across entire datasets, such as big data stores with billions or hundreds of billions of entries, using existing memory resources.

Figure 8:
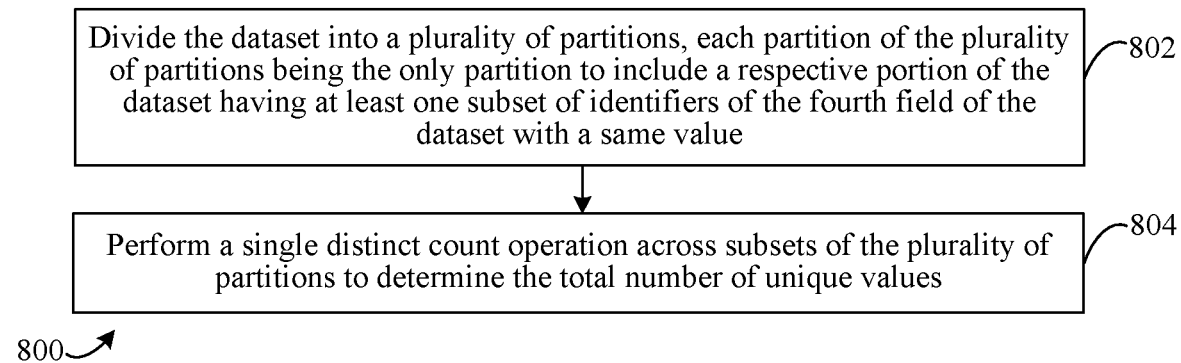
FIG. 8 shows a flowchart for scalable implementations for exact counts of distinct values in distributed query processing systems, according to an example embodiment.

Turning now to FIG. 8, a flowchart 800 is shown for scalable implementations of exact distinct counts and multiple exact distinct counts in distributed query processing systems, according to example embodiments. DB manager 208 may operate according to flowchart 800, in embodiments. Flowchart 800 may be an embodiment of flowchart 600 of FIG. 6 and/or flow diagram 700 of FIG. 7. Further structural and operational examples will be apparent to persons skilled in the relevant art(s) based on the following description. Flowchart 800 is described as follows with respect to system 100 of FIG. 1 and system 200 of FIG. 2.

Flowchart 800 begins at step 802. In step 802, the dataset is divided into a plurality of partitions, each partition of the plurality of partitions being the only partition to include a respective portion of the dataset having at least one subset of identifiers of the fourth field of the dataset with a same value. For instance, partitioner 212 may be configured to divide datasets into partitions, as described similarly above for step 308 of flowchart 300 an step 406 of flow diagram 400. As shown in step 708 and step 710 of flow diagram 700, an un-pivoted dataset having compound keys assigned (step 708) may be partitioned on distributed server group 106 (partition server 106a as Node1, partition server 106b as Node2, and partition server 106c as Node3). Partitioner 212 may divide the dataset shown in step 708 according to the User/Tenant field identifiers/values of the fourth field. In embodiments, each of the User/Tenant field identifiers/values are partitioned together, i.e., are partitioned to the same Node/the same partition server. For example, rows for User/Tenant 'a' and 'b' are only present on partition server 106a (Node 1), rows for User/Tenant 'x' are only present on partition server 106b (Node 2), etc.

In embodiments, step 802 may be performed subsequent to step 614 of flowchart 600 and/or prior to step 616.

In step 804, a single distinct count operation is performed across subsets of the plurality of partitions to determine the total number of unique values. For instance, aggregator 218 may be configured to determine the total number of unique values (e.g., as in step 616 of flowchart 600) for the User/Tenant field per compound key in the set as a single distinct count operation over the partitions. The results of this operation are exemplarily shown in step 712 of flow diagram 700, as described above.

Accordingly, rather than performing two separate distinct counts as specified in the incoming query, a single distinct count may be performed over the un-pivoted, blended, and flattened data of the dataset to achieve the same result as the specified multiple distinct count with less complex processing requirements, while also providing for a more balanced memory distribution utilization.

Figure 9:
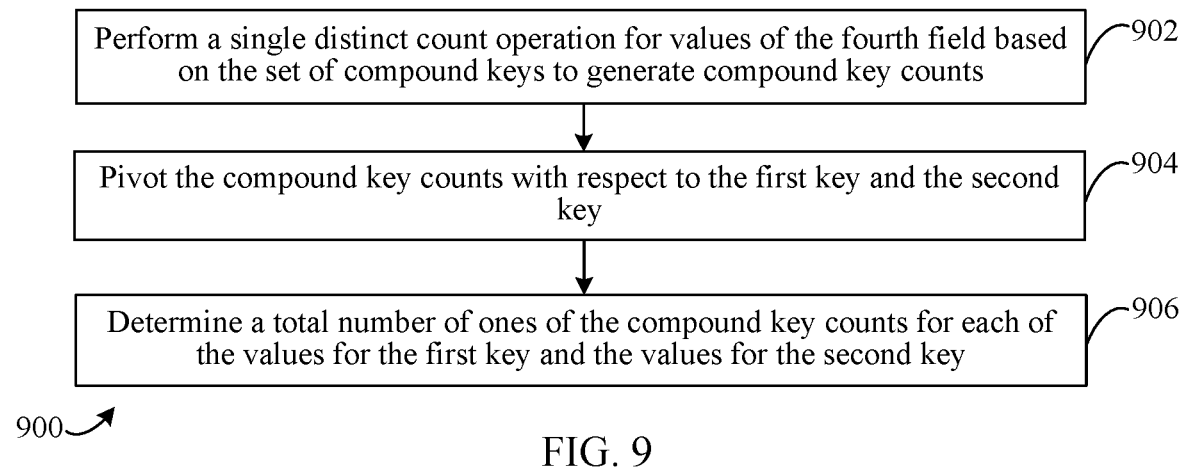
FIG. 9 shows a flowchart for scalable implementations for exact counts of distinct values in distributed query processing systems, according to an example embodiment.

Turning now to FIG. 9, a flowchart 900 is shown for scalable implementations of exact distinct counts and multiple exact distinct counts in distributed query processing systems, according to example embodiments. DB manager 208 may operate according to flowchart 900, in embodiments. Flowchart 900 may be an embodiment of flowchart 600 of FIG. 6 and/or flow diagram 700 of FIG. 7. Further structural and operational examples will be apparent to persons skilled in the relevant art(s) based on the following description. Flowchart 900 is described as follows with respect to system 100 of FIG. 1 and system 200 of FIG. 2.

Flowchart 900 begins at step 902. In step 902, a single distinct count operation is performed for values of the fourth field based on the set of compound keys to generate compound key counts. For instance, aggregator 218 may be configured to determine distinct counts for identifiers/values in datasets for keys and compound keys as similarly described in step 804 of flowchart 800 above. In step 902, the single distinct count operation is performed to generate compound key counts for each partition of step 710, as shown in step 712 of flow diagram 700. The compound key counts may comprise the counts of unique identifiers/values for the User/Tenant field for each compound key combination.

In embodiments, step 902 may be performed as part of step 616 of flowchart 600 and/or step 804 of flowchart 800.

In step 904, the compound key counts are pivoted with respect to the first key and the second key. For example, input blender 216 may be configured to pivot the dataset as shown in step 714 of flow diagram 700. Input blender 216 may pivot the compound key counts from step 712 to decouple the Field ID in the compound key from the application for the determination of total results. Thus, for each row of pivoted compound key counts, an application therein is associated with either a distinct count of users or of tenants, as in step 714.

In step 906, a total number of ones of the compound key counts is determined for each of the values for the first key and the values for the second key. For example, aggregator 218 may be configured to determine the total number of unique values (e.g., as in step 616 of flowchart 600) for the User and Tenant fields per each compound key portion for 'application' based on a single distinct count operation and the pivoted resulting data shown in step 714 of flow diagram 700. The final results of this operation are exemplarily shown in step 716 of flow diagram 700, subsequent to aggregation of all values, e.g., by aggregator 218.

Accordingly, operations required are reduced in number and complexity, thus reducing the requirements for system resources such as processing cycles and memory utilization, including memory allocation across distributed servers.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, such as system 100 of FIG. 1 and system 200 of FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a computing device in stationary or mobile computer embodiments, including one or more features of mobile systems and/or computing devices described herein, as well as alternative features. The descriptions of computing devices/systems provided herein are provided for purposes of illustration, and are not intended to be limiting. Embodiments may be implemented in further types of computer systems, as would be known to persons skilled in the relevant art(s).

Figure 10:
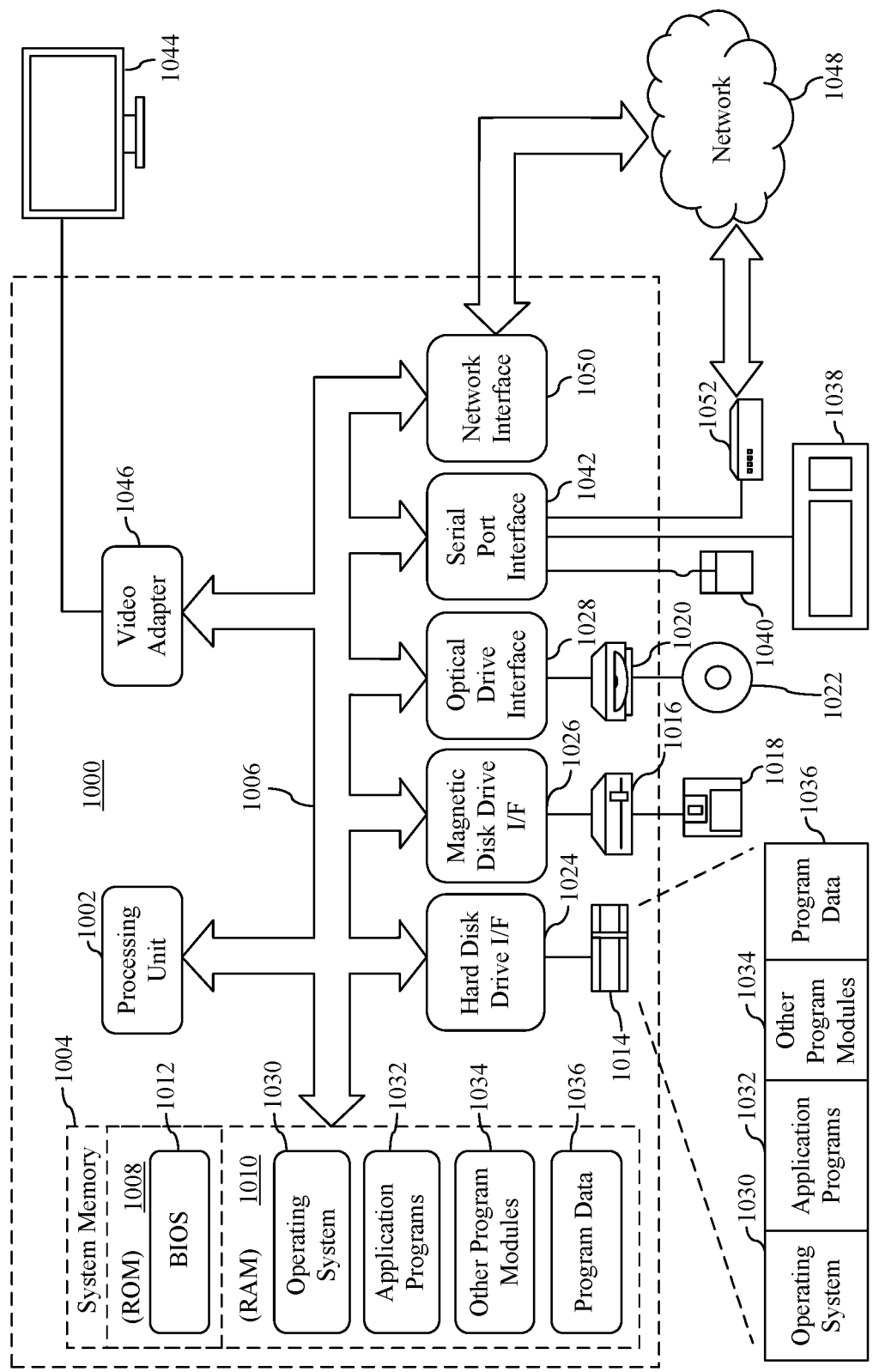
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems and/or game consoles, etc., as would be known to persons skilled in the relevant art(s).

As shown in FIG. 10, computing device 1000 includes one or more processors, referred to as processor circuit 1002 (also "processing unit" herein), a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as system 100 of FIG. 1 and system 200 of FIG. 2, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The described embodiments for scalable implementations of exact distinct counts and multiple exact distinct counts in distributed query processing systems are applicable beyond the example embodiments described above. For example, while embodiments in the Sections above may be described in the context of queries run against a database for distinct counts of users and/or tenants for hosted applications/services, the embodiments herein are not so limited and may also be applied for other types of requests, jobs, functions, and/or processes that may be run to determine exact distinct counts/multiple counts for any field of any store of data against any number of keys.

Furthermore, the described embodiments do not exist in software implementations for enhancements and improvements for scalable implementations of exact distinct counts and multiple exact distinct counts in distributed query processing systems. Conventional solutions lack the ability to scale for very large datasets, such as big data stores, become skewed for low distinctness of keys, and do not balance memory and processing allocation which leads to increased processing cycles being required and insufficient memory being available to fully perform counts. That is, unlike the embodiments herein, conventional solutions do not allow for efficient, exact determinations of distinct counts and multiple distinct counts though pivoting/un-pivoting of data, without slicing, nor searching for key presence on identifiers/values. As an example, embodiments provide for systems capable of performing exact distinct counts, and moreover timely and efficient distinct counts for an exact number of users stored in a very large dataset which is critical to combat fraud and data breaches for personal information. Nor do conventional solutions allow for input blending to perform multiple distinct counts for a key as a single distinct count operation to reduce processing complexity. As an additional example of this improvement, the embodiments for multiple distinct counts also eliminate the need for performing a join or cross join operation over the fields to be counted, and by using only a single partitioning operation for the dataset, unlike conventional approaches. Still further, the described embodiments for multiple distinct counts also eliminate the need an extra partition of the data for a final count to combine the separately obtained count results together, as is required in conventional approaches.

The additional examples and embodiments described in this Section may be applicable to examples disclosed in any other Section or subsection of this disclosure.

A system is described herein. The system may be configured and enabled in various ways for determining a distinct count for identifiers based on keys, as described herein according to the embodiments for scalable implementations of exact distinct counts and multiple exact distinct counts in distributed query processing systems are implemented via systems and devices. The system includes a processing system with one or more processors and a memory that stores program code to be executed by the processing system.

The program code is configured to access a dataset that includes a plurality of fields, and sort the dataset according to the identifiers that are associated with a field of the plurality of fields for the dataset to generate a sorted dataset. The program code is also configured to divide the sorted dataset into a plurality of partitions, each partition of the plurality of partitions being the only partition to include a respective portion of the dataset having at least one subset of identifiers of a first field of the dataset with a same value. The program code is further configured to determine a presence of a key of the keys in the at least one subset on each partition of the plurality of partitions, and aggregate a number of instances of the determined presence of the key and generate a distinct count of values for the identifiers associated with the key.

In an embodiment, the system includes a plurality of distributed servers. In the embodiment, the program code is configured to divide the sorted dataset into the plurality of partitions at respective ones of the plurality of distributed servers according to a range partition operation, and the partitions are balanced according to numbers of the identifiers. In the embodiment, at each one of the plurality of distributed servers the presence of the key of the keys is determined for a corresponding one of the plurality of partitions.

In an embodiment of the system, the program code is configured to divide the sorted dataset into the plurality of partitions according to a range partition operation, the partitions being balanced according to numbers of the identifiers, and determine the presence of the key of the keys for each one of the plurality of partitions via a corresponding separate logical processing space of the processing system.

In an embodiment of the system, the program code is configured to receive an instruction for determining an exact, distinct count for the identifiers associated with the key, wherein the identifiers are at least one of user identifiers, tenant identifiers, numbers of accesses, or access times, and wherein the key is at least one of a hosted web service, a hosted web application, or a search term.

In an embodiment of the system, the program code is configured to determine a ratio of the keys to the identifiers for the dataset, and sort the dataset based at least on a comparison of the ratio to a threshold value.

In an embodiment of the system, the dataset includes log entries having data for at least one of a hosted web service or a hosted web application. In an embodiment, the system is a cloud-based system that hosts big data storage for the dataset.

A computer-implemented method is also described herein. In embodiments, the computer-implemented method is for determining a distinct count for identifiers on keys, as described herein according to the embodiments for scalable implementations of exact distinct counts and multiple exact distinct counts in distributed query processing systems are implemented via systems and devices. The computer-implemented method may be implemented by a database host and/or distributed servers.

The computer-implemented method includes sorting a dataset according to the identifiers to generate a sorted dataset, the identifiers being values for a field of the dataset, and dividing the sorted dataset into a plurality of partitions, each partition of the plurality of partitions being the only partition to include a respective portion of the dataset having at least one subset of identifiers of a first field of the dataset with a same value. The method also includes determining, for each partition of the plurality of partitions, a presence of a key of the keys in the at least one subset, and aggregating a number of instances of the determined presence of the key and generate a distinct count for the identifiers associated with the key.

In an embodiment of the computer-implemented method, each partition of the plurality of partitions is provided to respective logically separate portions of a processing system for the determining subsequent to the dividing. In the embodiment, the dividing further includes dividing the sorted dataset into the plurality of partitions according to a range partition operation, wherein the partitions are balanced according to numbers of the identifiers. In the embodiment, determining the presence of the key of the keys includes determining the presence of the key of the keys for each of the plurality of partitions at a corresponding one of the logically separate portions.

In an embodiment of the computer-implemented method, the logically separate portions of the processing system include a plurality of distributed servers.

In an embodiment, the computer-implemented method further includes receiving an instruction for determining an exact, distinct count for the identifiers associated with the key, wherein the identifiers are at least one of user identifiers, tenant identifiers, numbers of accesses, or access times, and wherein the key is at least one of a hosted web service, a hosted web application, or a search term.

In an embodiment, the computer-implemented method further includes determining a ratio of the keys to the identifiers for the dataset, and sorting the dataset includes sorting the dataset based at least on a comparison of the ratio to a threshold value.

In an embodiment of the computer-implemented method, the dataset includes log entries having data for at least one of a hosted web service or a hosted web application. In an embodiment of the computer-implemented method, the computer-implemented method is implemented in a system that is cloud-based and that hosts big data storage for the dataset.

A computer-readable storage medium having program instructions recorded thereon that, when executed by one or more processors, perform a method for determining a distinct count for identifiers on keys is also described herein. In embodiments, the method is for scalable implementations of exact distinct counts and multiple exact distinct counts in distributed query processing systems are implemented via systems and devices, as described herein.

The method includes sorting a dataset according to the identifiers in a field of the dataset to generate a sorted dataset, and dividing the sorted dataset into a plurality of partitions, each partition of the plurality of partitions being the only partition to include a respective portion of the dataset having at least one subset of identifiers of a first field of the dataset with a same value. The method also includes providing each partition of the plurality of partitions to respective logically separate portions of a processing system, determining at ones of the respective logically separate portions a presence of a key of the keys in the at least one subset on each partition of the plurality of partitions, and aggregating a number of instances of the determined presence of the key and generating a distinct count for the identifiers associated with the key.

In an embodiment for the computer-readable storage medium, the dividing of the method includes dividing the sorted dataset into the plurality of partitions according to a range partition operation, wherein the partitions are balanced according to numbers of the identifiers.

In an embodiment for the computer-readable storage medium, the logically separate portions of the processing system include a plurality of distributed servers.

In an embodiment for the computer-readable storage medium, the method further includes receiving an instruction for determining an exact, distinct count for the identifiers associated with the key, wherein the identifiers are at least one of user identifiers, tenant identifiers, numbers of accesses, or access times, and wherein the key is at least one of a hosted web service, a hosted web application, or a search term.

In an embodiment for the computer-readable storage medium, the method further includes determining a ratio of the keys to the identifiers for the dataset, and sorting the dataset includes sorting the dataset based at least on a comparison of the ratio to a threshold value.

In an embodiment for the computer-readable storage medium, the dataset includes log entries having data for at least one of a hosted web service or a hosted web application, or the one or more processors are of a system that is a cloud-based system that hosts big data storage for the dataset.

Another system is described herein. The system may be configured and enabled in various ways for determining multiple distinct counts for values based on a key, as described herein according to the embodiments for scalable implementations of exact distinct counts and multiple exact distinct counts in distributed query processing systems are implemented via systems and devices. The system includes a processing system with one or more processors and a memory that stores program code to be executed by the processing system.

The program code is configured to access a dataset that includes a first field, a second field, and a third field, and to combine the first field with the second field to generate a fourth field. The program code is also configured to generate a set of compound keys that includes two or more compound keys each comprised of a different combination of one of at least two identifiers for the first field and the second field with one of at least two values for the third field. The program code is further configured to assign a corresponding compound key of the set of compound keys to each value of the fourth field, and determine a total number of unique values of the fourth field for each value in the third field, based at least in part on the set of compound keys, as the multiple distinct counts.

In an embodiment of the system, to combine the first field with the second field, the program code is configured to un-pivot the dataset based on a first column associated with the first field and a second column associated with the second field to combine the first field and the second field into the fourth field.

In an embodiment of the system, to un-pivot the dataset, the program code is configured to generate for the fourth field a fourth column associated therewith, the fourth column including a separate row having values for each value in the first field and for each value in the second field, and modify a third column associated with the third field to generate a modified third column that includes a number of rows for each separate row of the fourth column, each row in the number of rows for the modified third column having a corresponding value from the third column for each separate row.

In an embodiment of the system, the program code is configured to divide the dataset into a plurality of partitions, each partition of the plurality of partitions being the only partition to include a respective portion of the dataset having at least one subset of identifiers of the fourth field of the dataset with a same value, and perform a single distinct count operation across subsets of the plurality of partitions to determine the total number of unique values.

In an embodiment of the system, the at least two identifiers for the first field and the second field includes values for a first key of a given compound key, and the at least two values for the third field includes values for a second key of the given compound key. In the embodiment of the system, to determine a total number of unique values, the program code is configured to perform a single distinct count operation for values of the fourth field based on the set of compound keys to generate compound key counts, pivot the compound key counts with respect to the first key and the second key, and determine a total number of ones of the compound key counts for each of the values for the first key and the values for the second key.

In an embodiment of the system, the at least two identifiers for the first field and the second field include alphanumeric field identifiers that uniquely identify the first field and the second field.

In an embodiment of the system, the dataset includes log entries having data for at least one of a hosted web service or a hosted web application, or the system is a cloud-based system that hosts big data storage for the dataset.

Another computer-implemented method is also described herein. In embodiments, the computer-implemented method is for determining multiple distinct counts for values based on a key, as described herein according to the embodiments for scalable implementations of exact distinct counts and multiple exact distinct counts in distributed query processing systems are implemented via systems and devices. The computer-implemented method may be implemented by a database host and/or distributed servers.

The computer-implemented method includes combining a first field of a dataset with a second field of the data set to generate a fourth field, and generating a set of compound keys that includes two or more compound keys, each of the compound keys comprised of at least a first key and a second key, and being a different combination of first values for the first key and second values for the second key. The computer implemented method also includes assigning a corresponding compound key of the set of compound keys to each value of the fourth field, and determining a total number of unique values of the fourth field for each value in a third field, based at least in part on the set of compound keys, as the multiple distinct counts.

In an embodiment of the computer-implemented method, combining the first field with the second field includes un-pivoting the dataset based on a first column associated with the first field and a second column associated with the second field to combine the first field and the second field into the fourth field.

In an embodiment of the computer-implemented method, un-pivoting the dataset includes generating for the fourth field a fourth column associated therewith, the fourth column including a separate row having values for each value in the first field and for each value in the second field, and modifying a third column associated with the third field to generate a modified third column that includes a number of rows for each separate row of the fourth column, each row in the number of rows for the modified third column having a corresponding value from the third column for each separate row.

In an embodiment, the computer-implemented method further includes dividing the dataset into a plurality of partitions, each partition of the plurality of partitions being the only partition to include a respective portion of the dataset having at least one subset of identifiers of the fourth field of the dataset with a same value, and determining the total number of unique values includes performing a single distinct count operation across subsets of the plurality of partitions.

In an embodiment of the computer-implemented method, the first values include at least two unique alphanumeric field identifiers for the first field and the second field, and wherein the second values include at least two values for the third field.

In an embodiment of the computer-implemented method, determining the total number of unique values includes performing a single distinct count operation for values of the fourth field based on the set of compound keys to generate compound key counts, pivoting the compound key counts with respect to the first key and the second key, and determining a total number of ones of the compound key counts for each of the values for the first key and the values for the second key.

In an embodiment of the computer-implemented method, the dataset comprises log entries having data for at least one of a hosted web service or a hosted web application, or the computer-implemented method is performed by a system that is a cloud-based system that hosts big data storage for the dataset.

Another computer-readable storage medium having program instructions recorded thereon that, when executed by one or more processors, perform a method for determining multiple distinct counts for values based on a key is also described, according to embodiments for scalable implementations of exact distinct counts and multiple exact distinct counts in distributed query processing systems are implemented via systems and devices, as described herein.

The method includes combining a first field of a dataset with a second field of the data set to generate a fourth field, and generating a set of compound keys that includes two or more compound keys, each of the compound keys comprised of at least a first key associated with the first field and second field, and a second key associated with a third field, and being a different combination of first values for the first key and second values for the second key. The method also includes assigning a corresponding compound key of the set of compound keys to each value of the fourth field, and determining a total number of unique values of the fourth field for each value in the third field, based at least in part on the set of compound keys, as the multiple distinct counts.

In an embodiment for the computer-readable storage medium, combining the first field with the second field includes un-pivoting the dataset based on a first column associated with the first field and a second column associated with the second field to combine the first field and the second field into the fourth field. In an embodiment, un-pivoting the dataset includes generating for the fourth field a fourth column associated therewith, the fourth column including a separate row having values for each value in the first field and for each value in the second field, and modifying a third column associated with the third field to generate a modified third column that includes a number of rows for each separate row of the fourth column, each row in the number of rows for the modified third column having a corresponding value from the third column for each separate row.

In an embodiment for the computer-readable storage medium, the method further includes dividing the dataset into a plurality of partitions, each partition of the plurality of partitions being the only partition to include a respective portion of the dataset having at least one subset of identifiers of the fourth field of the dataset with a same value, and determining the total number of unique values includes performing a single distinct count operation across subsets of the plurality of partitions.

In an embodiment for the computer-readable storage medium, the first values include at least two unique alphanumeric field identifiers for the first field and the second field, and wherein the second values include at least two values for the third field.

In an embodiment for the computer-readable storage medium, determining the total number of unique values includes performing a single distinct count operation for values of the fourth field based on the set of compound keys to generate compound key counts, pivoting the compound key counts with respect to the first key and the second key, and determining a total number of ones of the compound key counts for each of the values for the first key and the values for the second key.

V Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system for determining a distinct count for identifiers based on keys, the system comprising:
   a processing system that includes one or more processors; and
   a memory configured to store program code to be executed by the processing system, the program code configured to:
      execute a query, which includes an instruction to determine a distinct count of values, against a dataset, said execute including:
         access the dataset that includes a plurality of fields;
         sort the dataset according to the identifiers that are associated with a field of the plurality of fields for the dataset to generate a sorted dataset;
         divide the sorted dataset into a plurality of partitions for respective distribution to a plurality of distributed servers, each partition of the plurality of partitions being the only partition to include a respective portion of the dataset having at least one subset of identifiers of a first field of the dataset with a same value;
         determine, respectively by the plurality of distributed servers, a presence of a key of the keys in the at least one subset on each partition of the plurality of partitions, each key corresponding to a respective identifier of another field of the plurality of fields;
         aggregate a number of instances of the determined presence of the key; and
         generate and return as a result of the query the distinct count of values for the identifiers associated with the key.

2. The system of claim 1, comprising the plurality of distributed servers;
   wherein the program code is configured to:
      divide the sorted dataset into the plurality of partitions at respective ones of the plurality of distributed servers according to a range partition operation, wherein the partitions are balanced according to numbers of the identifiers; and
   wherein at each one of the plurality of distributed servers the presence of the key of the keys is determined for a corresponding one of the plurality of partitions.

3. The system of claim 1, wherein the program code is configured to:
   divide the sorted dataset into the plurality of partitions according to a range partition operation, wherein the partitions are balanced according to numbers of the identifiers; and
   determine the presence of the key of the keys for each one of the plurality of partitions via a corresponding separate logical processing space of the processing system.

4. The system of claim 1, wherein the program code is configured to:
   receive an instruction for determining an exact, distinct count for the identifiers associated with the key, wherein the identifiers are at least one of user identifiers, tenant identifiers, numbers of accesses, or access times, and wherein the key is at least one of a hosted web service, a hosted web application, or a search term.

5. The system of claim 1, wherein the program code is configured to:
   determine a ratio of the keys to the identifiers for the dataset; and
   wherein said sort the dataset is based at least on a comparison of the ratio to a threshold value.

6. The system of claim 1, wherein the dataset comprises log entries having data for at least one of a hosted web service or a hosted web application.

7. The system of claim 1, wherein the system is a cloud-based system that hosts big data storage for the dataset.

8. A computer-implemented method for determining a distinct count for identifiers on keys, the method comprising:
   executing a query, which includes an instruction to determine a distinct count of values, against a dataset, the executing including:
      sorting the dataset according to the identifiers to generate a sorted dataset, the identifiers being values for a field of the dataset;
      dividing the sorted dataset into a plurality of partitions for respective distribution to logically separate portions of a processing system, each partition of the plurality of partitions being the only partition to include a respective portion of the dataset having at least one subset of identifiers of a first field of the dataset with a same value;
      determining, for each partition of the plurality of partitions respectively by the logically separate portions, a presence of a key of the keys in the at least one subset, each key corresponding to a respective identifier of a second field of the dataset;
      aggregating a number of instances of the determined presence of the key; and
      generating and returning as a result of the query the distinct count for the identifiers associated with the key.

9. The computer-implemented method of claim 8, wherein each partition of the plurality of partitions is respectively provided to the logically separate portions of the processing system for said determining subsequent to said dividing, said dividing further comprising:
   dividing the sorted dataset into the plurality of partitions according to a range partition operation, wherein the partitions are balanced according to numbers of the identifiers; and
   wherein said determining the presence of the key of the keys comprises determining the presence of the key of the keys for each of the plurality of partitions at a corresponding one of the logically separate portions.

10. The computer-implemented method of claim 9, wherein the logically separate portions of the processing system comprise a plurality of distributed servers.

11. The computer-implemented method of claim 8, further comprising:
    receiving an instruction for determining an exact, distinct count for the identifiers associated with the key, wherein the identifiers are at least one of user identifiers, tenant identifiers, numbers of accesses, or access times, and wherein the key is at least one of a hosted web service, a hosted web application, or a search term.

12. The computer-implemented method of claim 8, further comprising:
    determining a ratio of the keys to the identifiers for the dataset;
    wherein said sorting the dataset comprises sorting the dataset based at least on a comparison of the ratio to a threshold value.

13. The computer-implemented method of claim 8, wherein the dataset comprises log entries having data for at least one of a hosted web service or a hosted web application.

14. The computer-implemented method of claim 8, wherein the computer-implemented method is implemented in a system that is cloud-based and that hosts big data storage for the dataset.

15. A computer-readable storage medium having program instructions recorded thereon that, when executed by one or more processors, perform a method for determining a distinct count for identifiers on keys, the method comprising:
   executing a query, which includes an instruction to determine a distinct count of values, against a dataset, the executing including:
      sorting the dataset according to the identifiers in a field of the dataset to generate a sorted dataset;
      dividing the sorted dataset into a plurality of partitions for respective distribution to logically separate portions of a processing system, each partition of the plurality of partitions being the only partition to include a respective portion of the dataset having at least one subset of identifiers of a first field of the dataset with a same value;
      providing each partition of the plurality of partitions respectively to the logically separate portions of a processing system;
      determining at ones of the respective logically separate portions a presence of a key of the keys in the at least one subset on each partition of the plurality of partitions, each key corresponding to a respective identifier of a second field of the dataset;
      aggregating a number of instances of the determined presence of the key; and
      generating and returning as a result of the query the distinct count for the identifiers associated with the key.

16. The computer-readable storage medium of claim 15, wherein said dividing comprises:
   dividing the sorted dataset into the plurality of partitions according to a range partition operation, wherein the partitions are balanced according to numbers of the identifiers.

17. The computer-readable storage medium of claim 15, wherein the logically separate portions of the processing system comprise a plurality of distributed servers.

18. The computer-readable storage medium of claim 15, wherein the method further comprises:
   receiving an instruction for determining an exact, distinct count for the identifiers associated with the key, wherein the identifiers are at least one of user identifiers, tenant identifiers, numbers of accesses, or access times, and wherein the key is at least one of a hosted web service, a hosted web application, or a search term.

19. The computer-readable storage medium of claim 15, wherein the method further comprises:
   determining a ratio of the keys to the identifiers for the dataset; and
   wherein sorting the dataset comprises sorting the dataset based at least on a comparison of the ratio to a threshold value.

20. The computer-readable storage medium of claim 15, wherein the dataset comprises log entries having data for at least one of a hosted web service or a hosted web application; or
   wherein the one or more processors are of a system that is a cloud-based system that hosts big data storage for the dataset.

* * * * *